US007555491B2

United States Patent
Cole et al.

(10) Patent No.: US 7,555,491 B2
(45) Date of Patent: Jun. 30, 2009

(54) REMOVING OVERFLOW ROWS IN A RELATIONAL DATABASE

(75) Inventors: Stephen Ray Cole, Elgin, TX (US); Michael Joseph McLaughlin, Jr., Austin, TX (US)

(73) Assignee: BMC Software, Inc., Houston, TX (US)

( * ) Notice: Subject to any disclaimer, the term of this patent is extended or adjusted under 35 U.S.C. 154(b) by 895 days.

(21) Appl. No.: 10/757,741

(22) Filed: Jan. 14, 2004

(65) Prior Publication Data

US 2005/0165818 A1    Jul. 28, 2005

(51) Int. Cl.
*G06F 7/00* (2006.01)
(52) U.S. Cl. ...................................... 707/102
(58) Field of Classification Search ........... 707/1, 707/4, 8, 206
See application file for complete search history.

(56) References Cited

U.S. PATENT DOCUMENTS

| 5,899,993 | A * | 5/1999 | Jenkins, Jr. ..................... 707/9 |
| 6,047,285 | A * | 4/2000 | Jacobs et al. ................... 707/4 |
| 6,950,834 | B2 * | 9/2005 | Huras et al. ................. 707/202 |
| 2005/0080979 | A1 * | 4/2005 | Wu et al. ........................ 711/1 |

OTHER PUBLICATIONS

Sockut, G., IBM Systems Journal, vol. 36, No. 3, 1997, pp. 1-19.*
Haderle et al., IBM Systems Journal, vol. 23, No. 2, 1984, pp. 112-125.*
Sockut et al., Computing Surveys, vol. 11, No. 4, 1979, pp. 371-395.*
Ramakrishnan, R., Database Management Systems, WCB/McGraw-Hill, p. 22, 1998.*
Lin et al., IEEE Transactions on Vehicular Technology, vol. 49, No. 2, Mar. 2000, pp. 520-530.*
Hung et al., IEEE Journal of Selected Areas in Communications, vol. 19, No. 10, Oct. 2001, pp. 1953-1961.*

* cited by examiner

*Primary Examiner*—Cheyne D Ly
(74) *Attorney, Agent, or Firm*—Wong, Cabello, Lutsch, Rutherford & Brucculeri, LLP

(57) ABSTRACT

Techniques to repair overflow rows in a relational database table are described. In one implementation, a source table's physical memory pages are interrogated to identify overflow rows. In another implementation, overflow rows generated during database update operations are identified from non-table sources (e.g., log files). In general, overflow rows are repaired by: unloading one or more rows identified as overflow rows; locking the source table from outside access; disabling or deleting any associations associated with the unloaded rows; deleting the identified overflow/unloaded rows from the source table; reloading the previously unloaded rows back into the source table; restoring any associations previously disabled/deleted; and unlocking the tables. Rows may be processed in groups small enough not to significantly impact users accessing either the source or associated tables.

72 Claims, 4 Drawing Sheets

REMOVING OVERFLOW ROWS IN A RELATIONAL DATABASE

BACKGROUND

The invention relates generally to relational database systems and, more particularly but not by way of limitation, to a means for identifying and removing overflow rows from a relational database table.

Business environments are becoming progressively more complex for companies of all sizes. Much of this complexity arises from the growing amount of information it takes to conduct business and the many users and uses of this information. In this environment, a corporation's data sources may become its number one asset. The rapidly growing areas of e-business, data warehouses and enterprise resource management require data be delivered quickly and efficiently. These applications typically use relational databases as their data source, with the databases forming the foundation of the corporation's computing architecture. Since these databases act as the corporate data server, they can quickly turn into a single point of failure crippling and entire organization should they become disabled or function poorly.

Database failure can be measured in two ways: unplanned outages and poor response time. While it is easy to comprehend that unplanned outages have a direct impact on revenue for most corporations, business research firms have concluded that poor response time can result in the same type of revenue loss, particularly for e-business applications. One of the primary reasons a database responds poorly to queries is fragmentation. Fragmentation occurs as a natural by-product of database updates (e.g., through the structured query language "UPDATE" statement) and is generally embodied in "overflow" rows. An overflow row is a row ("record") of data that is small enough to fit on a single page of memory but which is, in fact, stored across two or more pages. Similarly, index records/rows may also become fragmented.

Because an overflow row's data is unnecessarily distributed across multiple pages of memory, a simple request to retrieve a single overflow row can require the generation of multiple unnecessary physical input-output requests. Thus, overflow rows impose a performance penalty on any access to a fragmented row. It will be recognized by those of ordinary skill in the art, this penalty is especially acute in the case of table scans and index range scans.

By way of example, consider the DB2® database environment. (DB2 is a registered trademark of International Business Machines Corporation of Armonk, N.Y.) Within a DB2® environment, database tables are created within a tablespace where a tablespace is comprised of one or more containers. All data within a DB2® database is stored in pages (a specified amount of physical storage). Page size is determined at tablespace creation and may be specified in 4 K, 8 K, 16 K and 32 K sizes. Pages are grouped into allocation units called extents. During database insert operations, DB2® will write to a container until its specified extent capacity is reached, at which point a new extent worth of storage is allocated in the next container where write activities are continued. Over time, the normal process of memory allocation in response to update operations can generate significant numbers of overflow rows and impact the database's performance. To resolve the performance degradation resulting form overflow rows, the prior art reorganizes the affected table.

Referring to FIG. 1, reorganization process 100 in accordance with the prior art locks the table being reorganized (the "source" table) so that users can not access it during the reorganization process (block 105). Next, the source table's data is unloaded (block 110). The unloaded data is then reordered and overflow rows are eliminated as it is loaded back into a newly created table having the same structure as the source table (block 115) and indexes associated with the source table are rebuilt to reflect the structure and content of the new table (block 120). Once the new table is loaded and its indexes are rebuilt, the new table replaces the original table (block 125), where after access is permitted to the reorganized table (block 130).

One significant drawback with prior art schemes such as that outlined in FIG. 1, is that they can result in data being offline for an extended period of time. The larger the source table, the longer this outage. Thus, maintaining a table in accordance with prior art techniques to improve its performance can cause an outage—the very act these maintenance operations are designed to avoid. Accordingly, it would be beneficial to provide a mechanism to detect and remove overflow rows from a relational database table without significantly impacting the table's availability to users. It would be a further advance to provide a mechanism to dynamically remove overflow rows from a relational database table without significantly impacting the table's availability to users.

SUMMARY

The invention provides a means to identify and repair overflow rows in a relational database. In one embodiment, the invention provides a method that includes retrieving a page of memory associated with a source table, interrogating the page of memory to identify an overflow row, unloading the identified overflow row from the source table, deleting the identified overflow row from the source table and loading the previously unloaded identified overflow row into the source table. In another embodiment, table overflow rows are identified from a non-table source of information such as log files. In still other embodiments, constraints associated with one or more identified overflow rows may be disabled prior to deleting the overflow rows with which they are associated. In this latter embodiment, the disabled constraints may be restored (e.g., rebuilt) following reloading of the relevant rows into the source table. Methods in accordance with the invention may be stored in any media that is readable and executable by a programmable control device such as a computer.

DETAILED DESCRIPTION

Techniques (including methods and devices) to dynamically remove overflow rows from a relational database table are described. The following embodiments of the invention, described in terms of a DB2® database and structured query language ("SQL") commands are illustrative only and are not to be considered limiting in any respect. For example, the invention is equally applicable to other relational databases such as Oracle, Sybase®, Microsoft's SQL Server®, Microsoft Access® and MySQL®. (Sybase and SQL Server are registered trademarks of Sybase, Inc. of Concord, Mass. Microsoft Access is a registered trademark of Microsoft Corporation of Redmond, Wash. MySQL is a registered trademark of MySQL AB, a company of Knivsta, Sweden.)

In one embodiment, a source table's overflow rows are detected through inspection of physical storage and repaired without taking the table offline for extended periods of time as in prior art reorganization techniques. In another embodiment, a table's overflow rows are detected through secondary means (e.g., log files) and repaired on a user-specified timescale. In yet another embodiment, these techniques may be combined to first remove preexisting overflow rows from a designated table and then to dynamically repair overflow rows as they are created.

Figure 1:
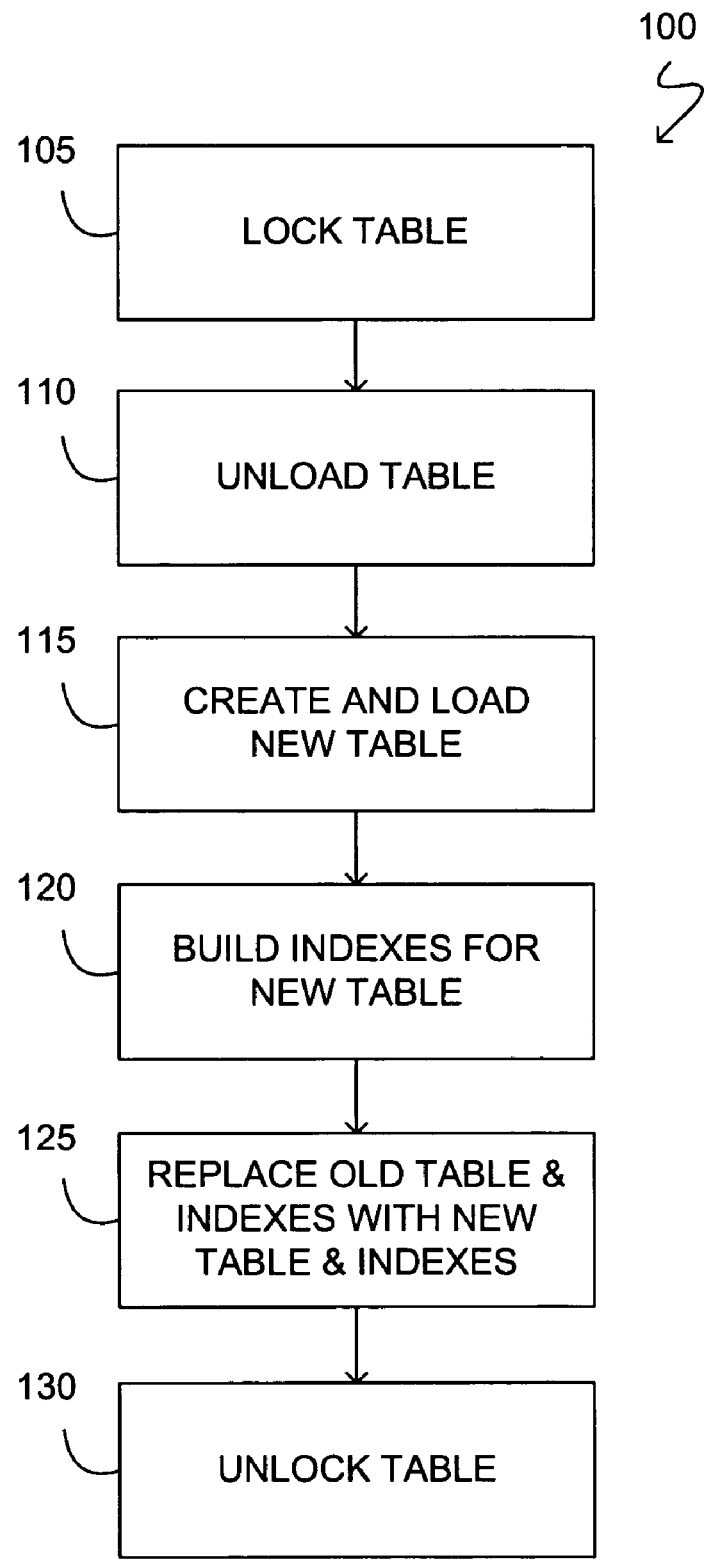
FIG. 1 shows a prior art reorganization technique for removing overflow rows from a relational database table.
Figure 2:
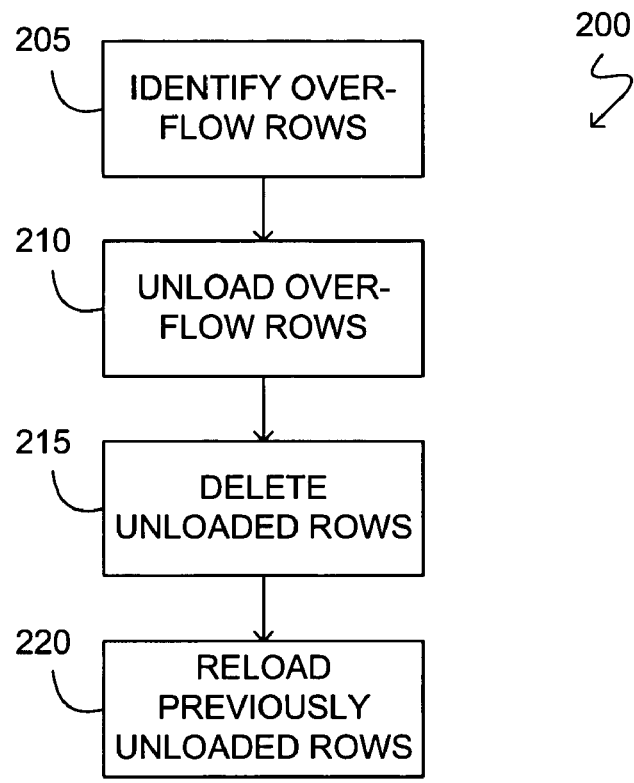
FIG. 2 shows, in block diagram form, an overflow row processing operation in accordance with one embodiment of the invention.

Referring to FIG. 2, overflow row processing/repair operation 200 in accordance with one embodiment of the invention is shown. Initially, all overflow rows in a designated source table are identified (block 205). The identified rows may then be unloaded (e.g., through the SQL "SELECT" statement) and retained in temporary storage (block 210). The rows selected during the acts of block 210 may then be deleted from the source table (block 215), after which they may be reloaded or inserted (e.g., through the SQL "INSERT" statement) back into the source table (block 220).

Figure 3:
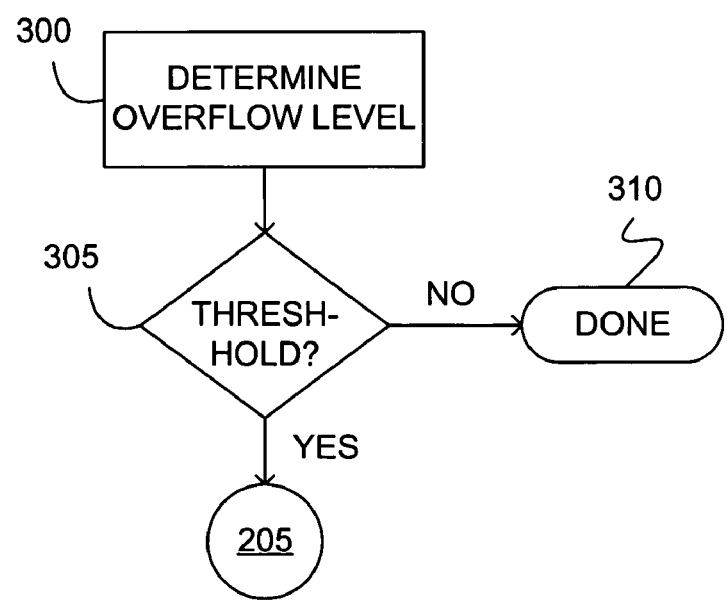
FIG. 3 shows, in block diagram form, an overflow row processing operation in accordance with one embodiment of the invention.

Referring to FIG. 3, acts in accordance with FIG. 2 may triggered by an initial determination that the source table has a sufficient number of overflow rows to cause an operational degradation of the source table (block 300). In the DB2® environment, for example, the RUNSTATS utility may be executed against the source table to determine its total number of overflow rows (table and/or index). Alternatively, a sample of database table containers may be made to determine or estimate the number of overflow rows in the table. If the determined number of overflow rows exceeds a specified threshold (the "YES" prong of block 305), processing continues in accordance with block 205 in FIG. 2. If the determined number of overflow rows does not exceed the specified threshold (the "NO" prong of block 305), overflow row processing in accordance with the invention is halted (block 310). One illustrative threshold is one (1). That is, if any overflow rows are detected, they are repaired. Another illustrative threshold is between 1% and 5% of the total number of rows in the source table.

Figure 4:
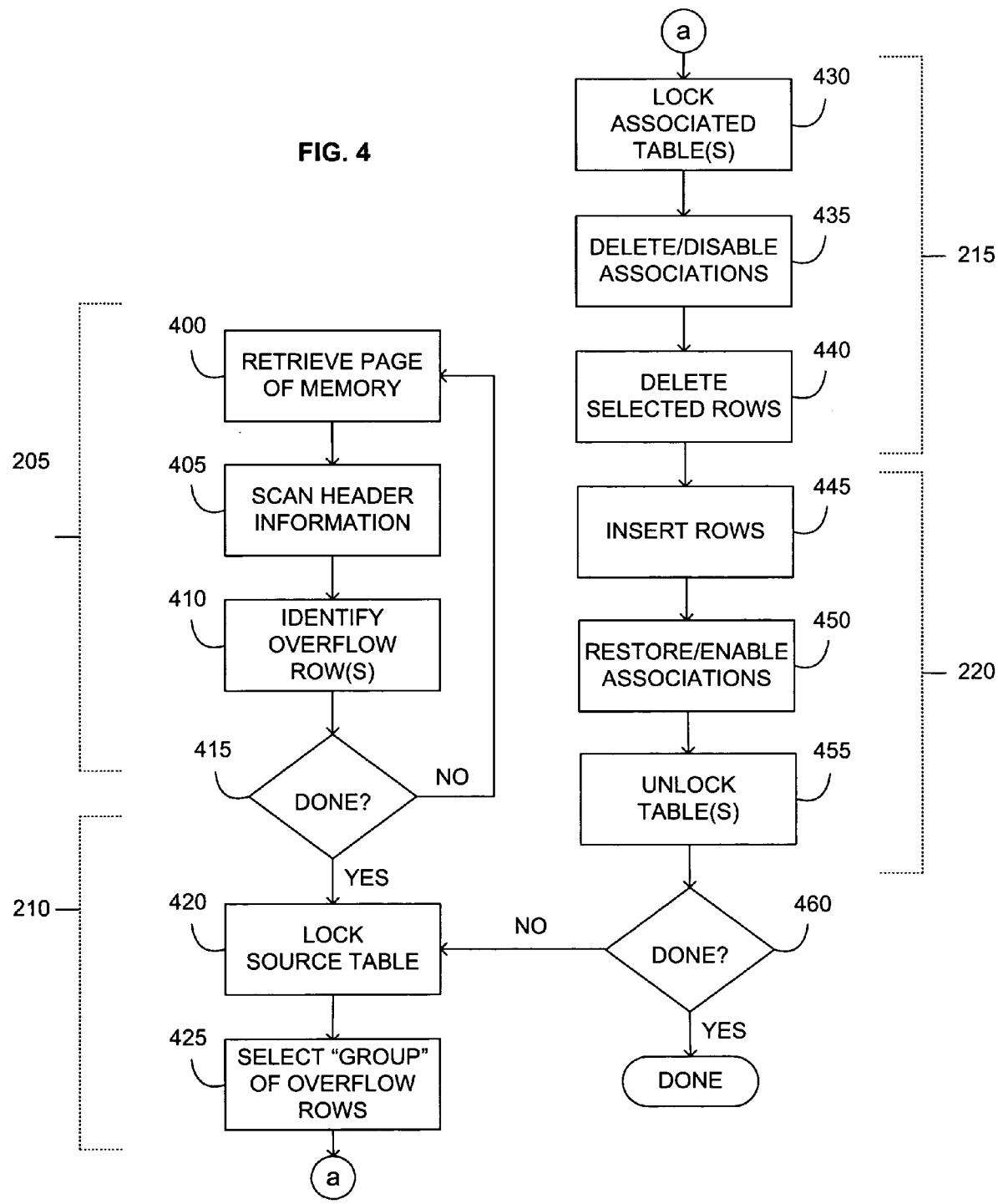
FIG. 4 shows, in block diagram form, an overflow row processing operation in accordance with another embodiment of the invention.

Referring now to FIG. 4, a more detailed outline of a process in accordance with FIG. 2 is shown. To begin, a page of memory associated with the designated source table is retrieved (block 400) and its header information is scanned to determine if it contains one or more overflow rows (block 405). Those rows determined to be overflow rows are identified (block 410). In one embodiment, overflow rows may be uniquely identified by a single identifier. In another embodiment, overflow rows may be uniquely identified by a primary key value. In some embodiments, if the row cannot be easily and uniquely identified, the contents of the entire row may be retained in a temporary storage. It will be recognized by those of ordinary skill in the art that a table's page memory may be retrieved from a long-term storage device such as a direct access storage device ("DASD") and/or from buffer memory utilized by the database management system ("DBMS") managing the source table. If not all pages comprising the relevant portion of the source table have been interrogated (the "NO" prong of block 415), processing in accordance with the invention continues at block 400. If all of the source table's relevant pages have been interrogated (the "YES" prong of block 415), the source table is locked so that other users are temporarily prevented from reading or writing to it (block 420) and one or more of the rows identified in accordance with the acts of block 410 are selected (block 425). In one embodiment, a table's "relevant" portion is the complete table and/or index. In another embodiment, a table's relevant portion is a designated number of pages. For example, acts in accordance with FIG. 4 may be performed on a first set of pages after which a pause in processing is performed before a second set of pages are processed. As one of ordinary skill in the art will recognize, the act of selecting (e.g., via the SQL "SELECT" statement) returns a complete copy of the designated row(s) which may be retained in buffer memory or placed into another temporary storage. Next, tables associated (e.g., by constraints and/or triggers) with one or more of the selected rows are locked (block 430) and any associations the selected rows have with these tables are disabled or deleted (block 435). In some embodiments, placing a lock on the source table may automatically cause the DMBS to lock the source table's associated tables. In such cases, the acts of block 430 are not performed explicitly. Rows selected in accordance with block 425 may then be deleted from the source table (block 440) and reinserted via, for example, the SQL "INSERT" statement (block 445). After insertion, any associations disabled and/or deleted during the acts of block 435 may be enabled and/or rebuilt (block 450) and the previously invoked locks are released (block 455). Again, if the source table's associated tables were implicitly locked by the DBMS as a result of performing the acts of block 420, such associated tables would be implicitly unlocked when the source table is unlocked. The acts of blocks 420-455 are repeated until all identified overflow rows have been repaired (the "NO" prong of block 460).

In one embodiment, the number of records (rows) selected during the acts of block 425 may be made small enough so as to not significantly impact user access to the source table. For example, if the maximum time users can be denied access (e.g., the time required to perform the acts of blocks 420-455) without significantly impacting the service relying upon the source table's data is two (2) seconds, then the number of rows processed in accordance with each invocation of blocks 420-455 is limited to those that can be processed in two (2) seconds. To further mitigate the impact of overflow row repair on users, a delay between successive invocations of acts in accordance with blocks 420-455 may be instituted.

Figure 5:
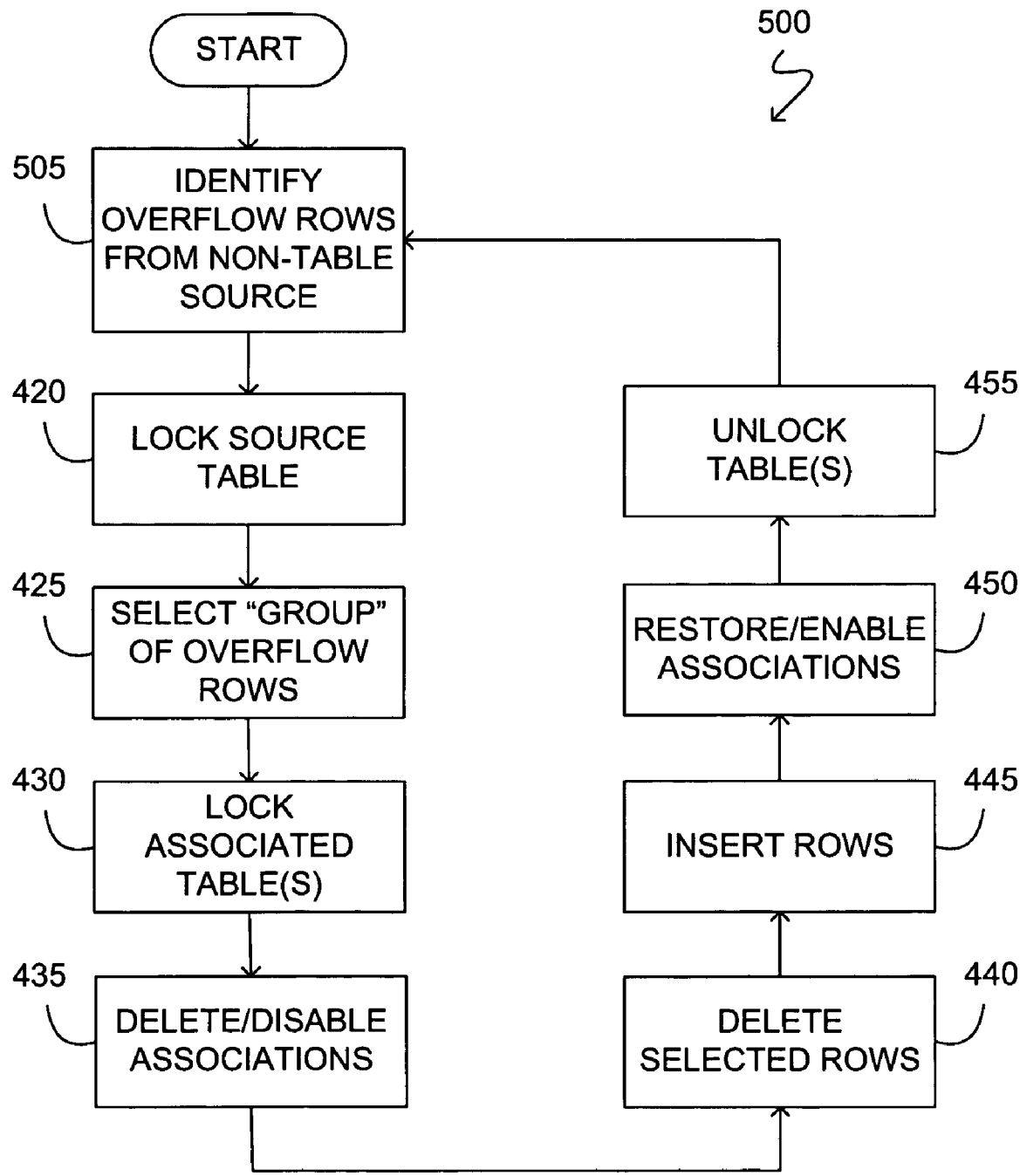
FIG. 5 shows, in block diagram form, a dynamic overflow row processing operation in accordance with one embodiment of the invention.

Referring to FIG. 5, overflow row repair operation 500 may be used to dynamically repair overflow rows. It will be recognized that during normal operations a DBMS maintains log files that, inter alia, identify when an updated row is an overflow row. For example, in the DB2® environment the system catalog identifies rows that are overflow rows. Thus, log files may be used to identify rows within a specified table to repair (block 505). Once identified, operations in accordance with blocks 420-455 may be performed as each overflow row is identified, at user-specified intervals (e.g., every hour) or specified thresholds (e.g., when the number of overflow rows exceeds a specified limit). See FIG. 5. In addition to, or instead of log files, operation 500 may scan DBMS buffer pool memory to identify overflow rows. Further, acts in accordance with block 505 may obtain overflow row information from a third-party process such as a commercial utility designed to note and/or log such events. As discussed above with respect to FIG. 4, if locking the source table causes tables associated with it (via, for example, referential constraints) to be locked, the acts of block 430 will not need to be performed explicitly.

In one embodiment, overflow row processing in accordance with operation 500 may be invoked at table creation time to ensure that overflow rows are repaired as they are generated. In another embodiment, operation 500 may be invoked on a table that has been recently repaired in accordance with, for example, FIG. 4. In yet another embodiment, operation 500 may be invoked on an arbitrary table. In this latter mode, only those overflow rows generated after invocation of dynamic repair operation 500 are repaired. In still another embodiment, operation 500 may be invoked to overlap with execution of the operation outlined in FIG. 4. A benefit of this approach is that it may identify and repair overflow rows generated during the initial scanning and repair operation of FIG. 4.

While the invention has been disclosed with respect to a limited number of embodiments, numerous modifications and variations will be appreciated by those skilled in the art. For instance, statistical techniques to determine when the number of overflow rows is "excessive" may be used—in addition to, or in place of, the empirical techniques discussed herein (e.g., the RUNSTATS utility in the DB2 environment). In addition, not all pages in a designated source table need be inspected as suggested in blocks 400-415. Specifically, only a portion of a table need be interrogated (e.g., those pages stored on a designated DASD). Further, if a second table is associated with the source table through a "deferred constraint," this constraint need not be disabled or deleted during the acts of block 435 and therefore not enabled or rebuilt during the acts of block 450. Still further, if a second table is related to the source table through only deferred constraints, it need not be locked during the acts of block 430 and, therefore, unlocked during the acts of block 255. In addition, in some DBMS it is not necessary to explicitly lock tables associated with the source table through, for example, constraints.

In addition, acts in accordance with FIGS. 2-5 may be performed by a programmable control device executing instructions organized into one or more program modules and stored in a storage device. A programmable control device may be a single computer processor, a plurality of computer processors coupled by a communications link, or a custom designed state machine. Storage devices suitable for tangibly embodying program instructions include, but are not limited to: magnetic disks (fixed, floppy, and removable) and tape; optical media such as CD-ROM disks; and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. An overflow row repair method, comprising:
   retrieving a page of memory associated with a source table;
   interrogating the page of memory to identify an overflow row that is stored across two or more pages of memory in the source table;
   unloading only the identified overflow row from the source table into storage;
   deleting the identified overflow row from the source table; and
   loading the previously unloaded identified overflow row from the storage into the source table such that the loaded row is not stored across two or more pages of memory in the source table.

2. The method of claim 1, wherein the acts of retrieving and interrogating are repeated for each page of memory comprising the source table.

3. The method of claim 1, wherein the acts of retrieving and interrogating are repeated for less than all pages of memory comprising the source table.

4. The method of claim 1, wherein the source table further comprises an index.

5. The method of claim 1, wherein the act of retrieving comprises retrieving the page of memory from a buffer pool.

6. The method of claim 1, wherein the act of retrieving comprising retrieving the page of memory from a direct access storage device.

7. The method of claim 1, further comprising locking the source table before deleting the identified overflow row from the source table.

8. The method of claim 7, wherein the act of deleting comprises:
   identifying a constraint associated with the identified overflow row;
   disabling the identified constraint; and
   deleting the identified overflow row from the source table.

9. The method of claim 8, further comprising locking a table associated with the identified constraint prior to the act of disabling.

10. The method of claim 8, wherein the act of disabling comprises dropping the identified constraint.

11. The method of claim 8, wherein the act of loading comprises:
    inserting the previously deleted identified overflow row into the source table;
    restoring the identified constraint; and
    unlocking the source table.

12. The method of claim 11, wherein the act of unlocking the source table unlocks a table associated with the identified constraint.

13. The method of claim 9, wherein if the identified constraint is a deferred constraint, the table associated with the identified constraint is not locked.

14. The method of claim 1, wherein the act of unloading comprises executing a structured query language SELECT statement.

15. The method of claim 14, wherein the act of deleting comprises executing a structured query language DELETE statement.

16. The method of claim 14, wherein the act of loading comprises executing a structured query language INSERT statement.

17. An overflow row repair method, comprising:
    retrieving one or more pages of memory associated with a source table;
    interrogating the one or more pages of memory to identify one or more overflow rows, each of the identified overflow rows being stored across two or more pages of memory in the source table;
    unloading only a first portion of the identified overflow rows from the source table; into storage;
    deleting the unloaded overflow rows from the source table; and
    reloading the previously unloaded overflow rows from the storage into the source table such that each of the loaded rows is not stored across two or more pages of memory in the source table.

18. The method of claim 17, wherein the act of retrieving comprises retrieving from a buffer pool.

19. The method of claim 17, wherein the act of retrieving comprises retrieving from a direct access storage device.

20. The method of claim 17, wherein the act of retrieving comprises retrieving one or more data pages associated with the source table.

21. The method of claim 17, further comprising locking the source table prior to the act of deleting.

22. The method of claim 21, further comprising:
identifying a constraint associated with at least one of the identified overflow rows; and
disabling the identified constraint.

23. The method of claim 22, wherein the act of disabling comprises dropping the identified constraint.

24. The method of claim 22, further comprising locking a table associated with the identified constraint prior to disabling the identified constraint.

25. The method of claim 22, wherein the act of reloading comprises:
inserting the previously unloaded overflow rows into the source table;
restoring the identified constraint; and
unlocking the source table and the table associated with the identified constraint.

26. The method of claim 25, wherein the act of restoring comprises rebuilding the identified constraint.

27. The method of claim 17, wherein the acts of unloading, deleting and reloading are repeated, wherein each iteration unloads, deletes and reloads a portion of the identified overflow rows.

28. An overflow row repair method, comprising:
identifying an overflow row associated with a source table from a non-source table data source, the overflow row being stored across two or more pages of memory in the source table;
unloading the identified overflow row from the source table into storage;
deleting the identified overflow row from the source table; and
reloading the previously deleted identified overflow row from the storage into the source table such that the loaded row is not stored across two or more pages of memory in the source table.

29. The method of claim 28, wherein the non-source table data source comprises a database log file.

30. The method of claim 28, wherein the source table further comprises an index.

31. The method of claim 28, further comprises locking the source table before deleting the identified overflow row from the source table.

32. The method of claim 31, further comprises unlocking the source table after the act of reloading the identified overflow row.

33. The method of claim 31, wherein the act of deleting comprises:
identifying a constraint associated with the identified overflow row;
disabling the identified constraint; and
deleting the identified overflow row from the source table.

34. The method of claim 33, wherein the act of disabling comprises locking a table associated with the identified constraint prior to the act of disabling the identified constraint.

35. The method of claim 34, wherein if the identified constraint is a deferred constraint, the table associated with the identified constraint is not locked.

36. The method of claim 33, wherein the act of disabling comprises deleting the identified constraint.

37. The method of claim 33, wherein the act of reloading comprises:
inserting the previously unloaded identified overflow rows into the source table;
restoring the identified constraint;
unlocking the source table.

38. The method of claim 37, wherein the act of restoring comprises rebuilding the identified constraint.

39. The method of claim 28, wherein the acts of unloading, deleting and loading are performed on a plurality of identified overflow rows at a time.

40. The method of claim 28, wherein the act of unloading comprises executing a structured query language SELECT statement.

41. The method of claim 40, wherein the act of deleting comprises executing a structured query language DELETE statement.

42. The method of claim 41, wherein the act of reloading comprises executing a structured query language INSERT statement.

43. A program storage device, readable by a programmable control device, comprising instructions stored on the program storage device for causing the programmable control device to:
retrieve a page of memory associated with a source table;
interrogate the page of memory to identify an overflow row that is stored across two or more pages of memory in the source table;
unload the identified overflow row from the source table into storage;
delete the identified overflow row from the source table; and
load the previously unloaded identified overflow row from the storage into the source table such that the loaded row is not stored across two or more pages of memory in the source table.

44. The program storage device of claim 43, wherein the instructions to retrieve and interrogate are repeated for each page of memory comprising the source table.

45. The program storage device of claim 43, wherein the instructions to retrieve and interrogate are repeated for less than all pages of memory comprising the source table.

46. The program storage device of claim 43, wherein the source table further comprises an index.

47. The program storage device of claim 43, wherein the instructions to retrieve comprise instructions to retrieve the page of memory from a buffer pool.

48. The program storage device of claim 43, wherein the instructions to retrieve comprise instructions to retrieve the page of memory from a direct access storage device.

49. The program storage device of claim 43, further comprising instructions to lock the source table before the instructions to delete the identified overflow row from the source table.

50. The program storage device of claim 49, wherein the instructions to delete comprise instructions to:
identify a constraint associated with the identified overflow row;
disable the identified constraint; and
delete the identified overflow row from the source table.

51. The program storage device of claim 50, further comprising instructions to lock a table associated with the identified constraint prior to the instructions to disable.

52. The program storage device of claim 50, wherein the instructions to disable comprise instructions to drop the identified constraint.

53. The program storage device of claim 50, wherein the instructions to load comprise instructions to:

insert the previously deleted identified overflow row into the source table;

restore the identified constraint; and unlock the source table.

54. The program storage device of claim 53, wherein the instructions to unlock the source table comprise instructions to unlock a table associated with the identified constraint.

55. The program storage device of claim 43, wherein the instructions to unload comprise a structured query language SELECT instruction.

56. The program storage device of claim 55, wherein the instructions to delete comprise a structured query language DELETE instruction.

57. The program storage device of claim 55, wherein the instructions to load comprises a structured query language INSERT statement.

58. A program storage device, readable by a programmable control device, comprising instructions stored on the program storage device for causing the programmable control device to:

identify an overflow row associated with a source table from a non-source table data source, the overflow row being stored across two or more pages of memory in the source table;

unload the identified overflow row from the source table into storage;

delete the identified overflow row from the source table; and reload the previously deleted identified overflow row from the storage into the source table such that the loaded row is not stored across two or more pages of memory in the source table.

59. The program storage device of claim 58, wherein the non-source table data source comprises a database log file.

60. The program storage device of claim 58, wherein the source table further comprises an index.

61. The program storage device of claim 58, further comprising instructions to lock the source table before the instructions to delete the identified overflow row from the source table.

62. The program storage device of claim 61, further comprising instructions to unlock the source table after the instructions to reload the identified overflow row.

63. The program storage device of claim 61, wherein the instructions to delete comprise instructions to:

identify a constraint associated with the identified overflow row;

disable the identified constraint; and delete the identified overflow row from the source table.

64. The program storage device of claim 63, wherein the instructions to disable comprise instructions to lock a table associated with the identified constraint prior to the instructions to disable the identified constraint.

65. The program storage device of claim 64, further comprising instructions to determine if the identified constraint is a deferred constraint and, if it is, not to lock the table associated with the identified constraint.

66. The program storage device of claim 63, wherein the instructions to disable comprise instructions to delete the identified constraint.

67. The program storage device of claim 63, wherein the instructions to reload comprise instructions to:

insert the previously unloaded identified overflow rows into the source table;

restore the identified constraint;

unlock the source table.

68. The program storage device of claim 67, wherein the instructions to restore comprise instructions to rebuild the identified constraint.

69. The program storage device of claim 58, wherein the instructions to unload, delete and load are performed on a plurality of identified overflow rows at a time.

70. The program storage device of claim 58, wherein the instructions to unload comprise a structured query language SELECT instruction.

71. The program storage device of claim 70, wherein the instructions to delete comprise a structured query language DELETE instruction.

72. The program storage device of claim 71, wherein the instructions to reload comprise a structured query language INSERT instruction.

* * * * *